Feb. 15, 1949.       H. E. KALLMANN       2,461,645
BALANCING MACHINE
Filed Dec. 22, 1943       5 Sheets-Sheet 1
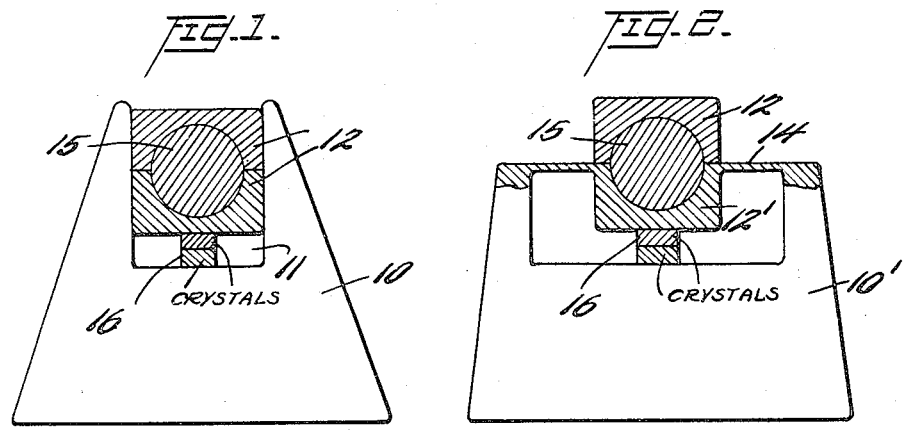
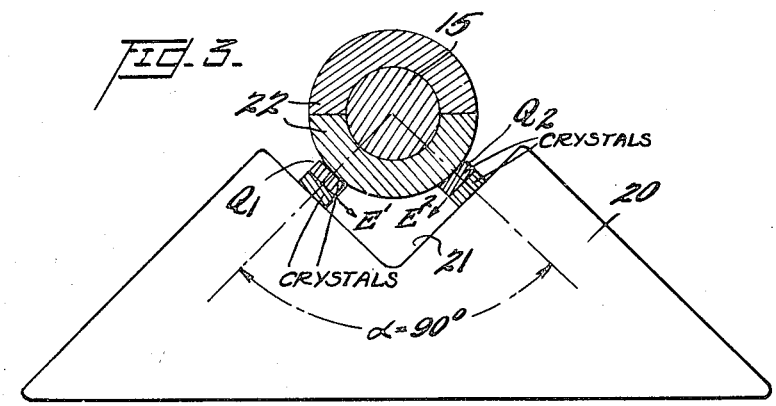
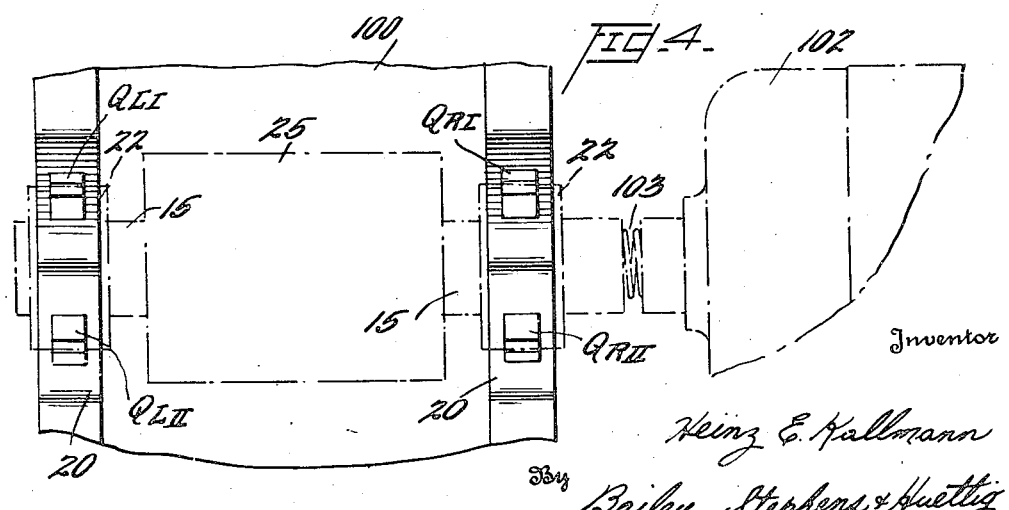

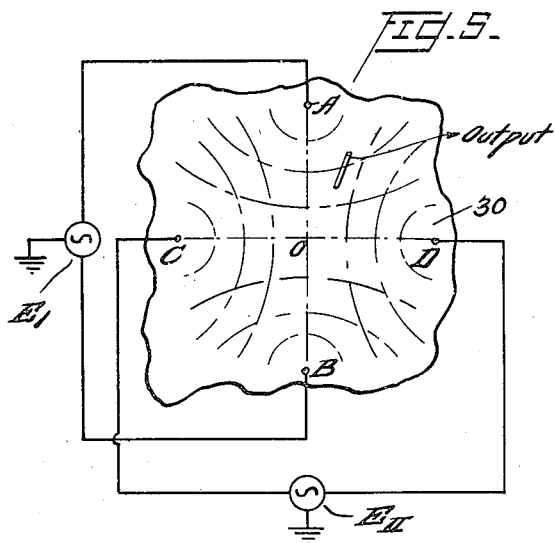
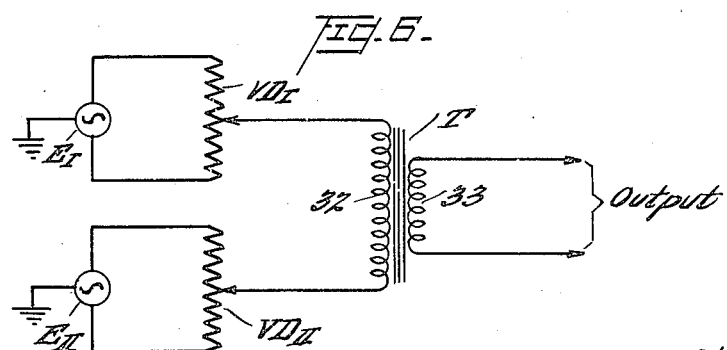
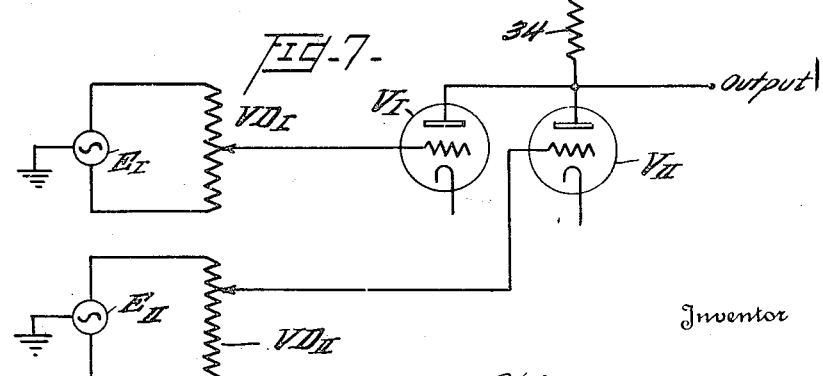

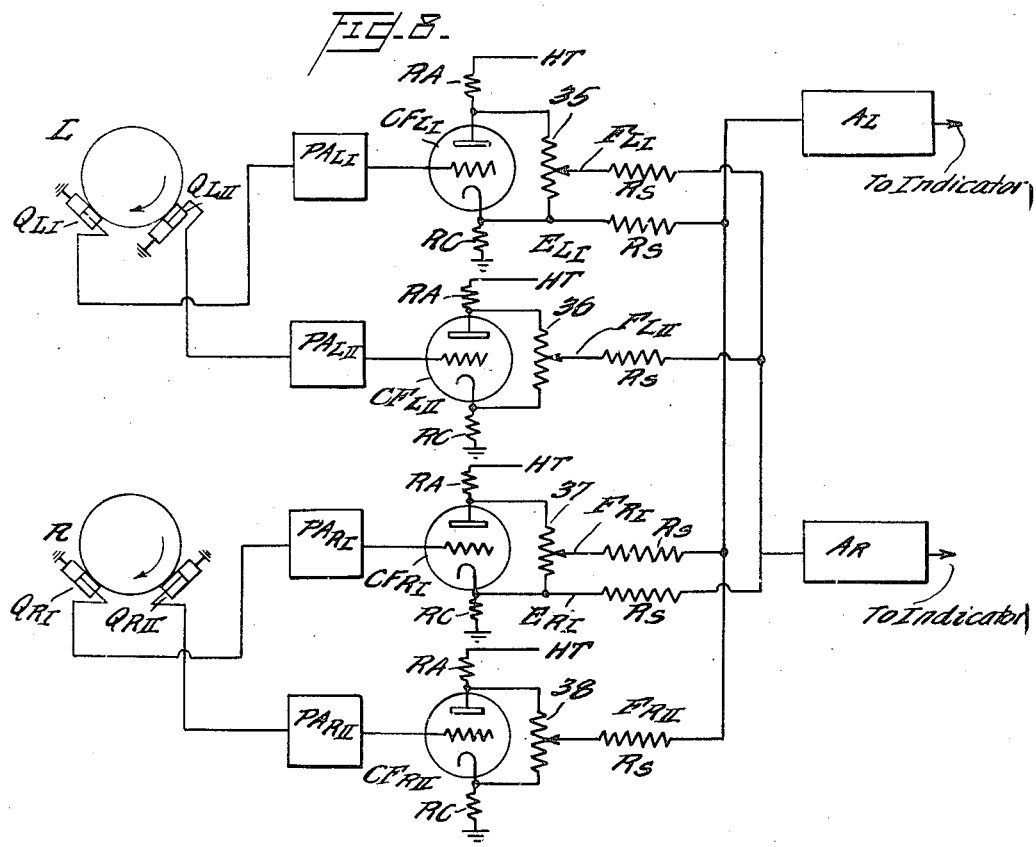
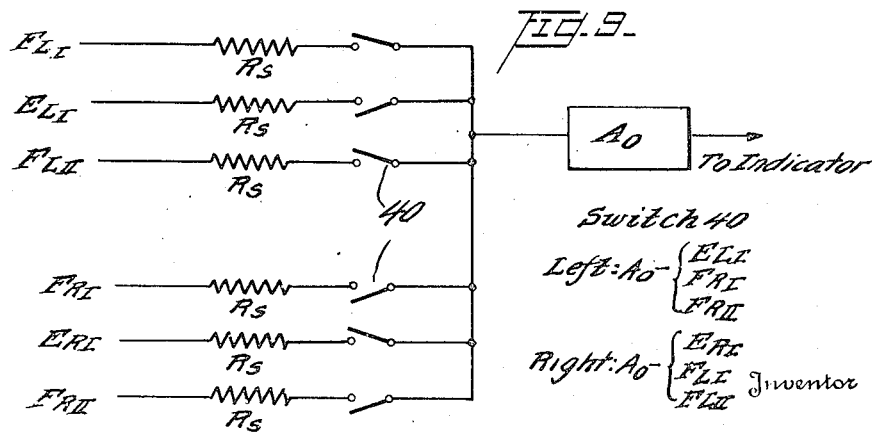

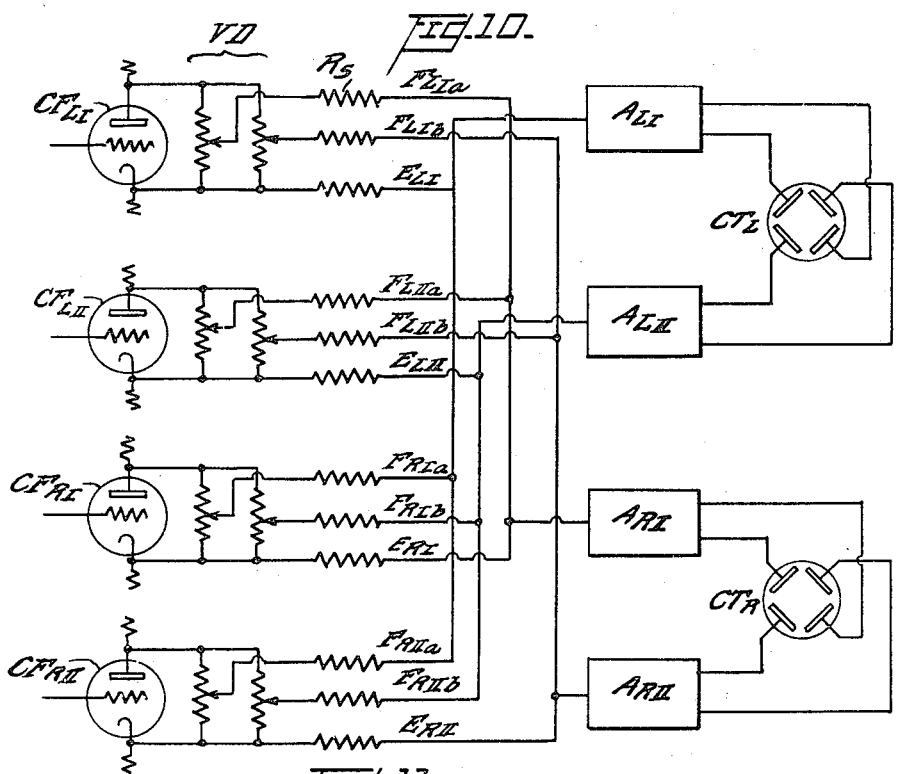
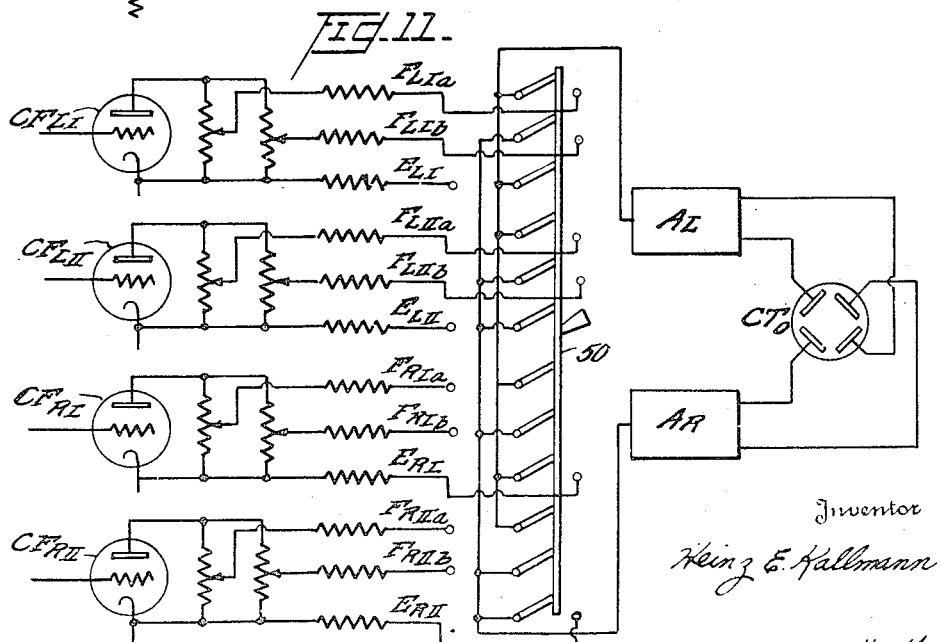

Feb. 15, 1949.   H. E. KALLMANN   2,461,645
BALANCING MACHINE

Filed Dec. 22, 1943   5 Sheets-Sheet 5

Inventor
Heinz E. Kallmann
By Bailey, Stephens & Huettig
Attorney

Patented Feb. 15, 1949

2,461,645

UNITED STATES PATENT OFFICE 2,461,645

BALANCING MACHINE

Heinz E. Kallmann, Boston, Mass., assignor to Gyro-Balance Corporation, Greenwich, Conn., a corporation of Delaware Application December 22, 1943, Serial No. 515,304

6 Claims. (Cl. 73—66)

This invention relates to balancing machines and more particularly to dynamic balancing machines for detecting the periodic forces of unbalance of a rotary body, and yielding a visual or other indication of the magnitude and orientation of such forces, whereby corrective additions or removals of weight may be applied to the body to bring it into perfect balance. By means of such devices, rotary shafts, spindles, rotors of electrical machines, and other moving parts may be brought into proper dynamic balance.

The general object of the invention is the provision of a novel and improved apparatus and system for testing such bodies for unbalance at any desired speed of rotation.

Another object of the invention is to provide in a machine of this class an arrangement of pickup devices for the signals indicating unbalance, by which resonance will be avoided especially those in or near the range of frequencies to be observed; and which will transmit substantially the whole unbalance forces to the pickup devices without shunting them by bearing or supporting means which would relieve the pickup devices of a portion of the forces of unbalance.

A further object is the provision, in a balancing machine of this general character, of means for supporting each end of a rotating body to be tested upon a pair of pickup elements, the elements of each pair being displaced angularly from each other about the axis of rotation of the body, and preferably arranged to support by themselves substantially the full weight of the body or to sustain substantially the full effects of the unbalance, and thereby make effective the earlier mentioned objects of the invention.

Other objects and other features of novelty will be apparent from the following specification when read in connection with the accompanying drawings in which certain embodiments of the invention are illustrated by way of example.

In the drawings,

Figure 1 is a somewhat diagrammatic view in end elevation of a pickup arrangement showing a sliding support for the rotating body;

Figure 2 is a similar view showing an elastic or flexible support;

Figure 3 is a similar diagrammatic view in end elevation of a bearing support according to the principles of the present invention, wherein two angularly separated pickup elements are employed;

Figure 4 is a somewhat diagrammatic plan view of a balancing machine of the type suggested in Figure 3, whereby the rotating body is supported at each end by a pair of pickup devices;

Figure 5 is a diagram illustrating by analogy the principles of adding voltage fractions, involved in the present invention;

Figures 6 and 7 are electrical diagrams illustrating two other schemes for adding voltage fractions;

Figure 8 is an electrical diagram depicting an apportioning network for amplifying and distributing the voltages generated at several pickup points;

Figure 9 is a modification of part of the system shown in Figure 8, whereby one final amplifier may be alternately used for the pickups at either end of the body;

Figure 10 is a diagram of attenuating, apportioning, and amplifying circuits for a balance indicating system;

Figure 11 is a modification of the system shown in Figure 10, wherein but one indicator is employed;

Figure 12:
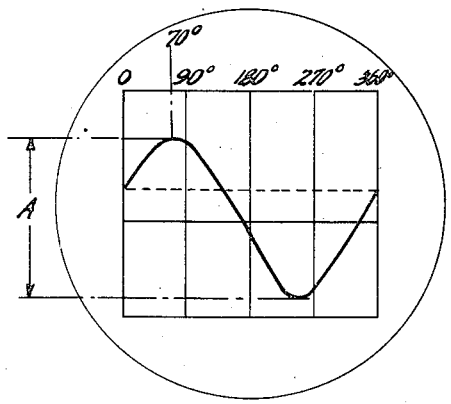
Figure 12 is a diagrammatic front view of the screen of a cathode ray tube showing one example of a light pattern indicating unbalance in the test piece, the screen being graduated for use in connection with the set-up shown in Figures 8 and 9.

Dynamic balancing machines serve to measure, in amplitude and phase, the vibration or pounding of an imperfectly balanced rotor upon its bearings. For correct readings, resonances and other sources of phase distortion must be avoided. This applies not only to the electrical indicating equipment used in connection with practically all of such machines, but also to mechanical resonances, in or near the range of frequencies observed, of members conveying the bearing pressures to the electrical pickup devices employed. Resonances from these latter sources are no less disturbing than those arising from electrical equipment, and are less easily eliminated.

Under actual working conditions, none of these mechanical parts may be considered as either weightless or perfectly rigid, therefore, the unavoidable resonances from these sources should be as few as possible, should lie well above the range of frequencies observed, and should be nearly aperiodically damped. Most disturbing in these respects are likely to be those devices which are used to support the bearings in their proper positions while allowing them freedom to transmit the vibrations or pounding to the electrical pickup elements.

Several types of bearing supports which have been proposed may therefore be eliminated from consideration in pursuing the present invention. For example, there is illustrated in Figure 1 of the drawings, in somewhat diagrammatic form, a bearing support 10 having rectangular slot or recess 11 wherein the bearing halves 12 may slide vertically. The shaft 15, exemplifying the body to be balanced, is rotatably mounted in the bearing member 12. A piezo-electric device 16, which may consist of the conventional stack or pile of quartz crystal plates, is disposed between the lower bearing member and the support 10, to sustain the weight of the body being tested and to register the periodic poundings which comprise the vibrations due to the unbalance of the body. For the minute movements involved in detecting these vibrations, such bearings sliding between guiding members as in Figure 1 may be ruled out due to the interference caused by the friction between bearings 12 and recess 11.

Elastic supports such as shown in Figure 2 of the drawings avoid this, but present other disadvantages. In Figure 2 the bearing support 10' is connected with the lower bearing member 12' by means of the relatively thin web 14. The other elements of the support including the shaft and pickup arrangements may be the same as shown in Figure 1. Such an elastic support, unless extremely flexible, acts as a shunt to the pickup device by relieving it of part of the pounding pressure. Thus, these supports reduce sensitivity and also are very apt to introduce undamped resonance within the observed range of frequencies.

It is therefore proposed to utilize, in the pursuit of the present invention, an electrical pickup device which itself serves as the member supporting the bearings, and to exclude substantially all other supporting members. One such arrangement is shown in Figure 3 of the drawings. A heavy foundation or bearing support 20 is provided, which is notched as at 21 to accommodate the shaft supports and pickup elements. The shaft 15 which either comprises or forms a portion of the body to be tested is carried in the bearing halves 22. Between the lower bearing half and the inclined surface of the notched portion 21 of the support 20, there are disposed two stacks of piezo-electric crystal plates Q1 and Q2, which are electrically connected with suitable amplifying and indicating devices, some of which will be described later. The crystals are stacked in all cases as shown in Figure 3 with surfaces of identical polarity facing outwardly and being grounded, and with the other surfaces of equal polarity facing each other at the inter-face which is connected to the signal lead to the preamplifier. These pickup elements Q1 and Q2 may be set with any angular separation around the axis of the test body substantially larger than 0° and substantially less than 180°, so as to provide the necessary lateral and vertical support for the bearing. A most satisfactory arrangement is to place the crystals at a separation of 90°. The sum of equally strong signals registered by the crystals indicates the vertical pounding indicative of the unbalance of the shaft. If $E_0$ equals the signal which would be received from a single indicator located vertically beneath the bearing as in Figures 1 and 2, then the sum of the signals $E_1$, and $E_2$ from crystals Q1 and Q2, respectively, in Figure 3 is $$E_s = E_1 + E_2 = 2E_0 \cos \frac{\alpha}{2}$$

If $\alpha = 90°$ then the sum is $$E_s = E_1 + E_2 = 1.41 E_0$$

The arrangement described has distinct advantages in that the pickup devices are not shunted by elastic or sliding members, as in Figures 1 and 2, and the great stiffness or rigidity of the piezo-electric crystals themselves insures a very high resonance frequency of the system in which the weight of the rotor and the bearing represents the mass and the compressibility of the crystals represents the elasticity of the system.

Thus the advantage of this arrangement is that it is very well suited for attaining the other objects of the invention involving the separate amplification of the signals from the two crystals and their observation on a circular pattern indicator as will be later described.

The function of a dynamic balancing machine is not only to detect the pounding action of an unbalanced rotating member upon its bearings, but to measure, preferably electrically, the amount of the resulting alternating pressure and to determine the direction of the unbalance vector relative to the rotor. It is obvious that unbalance situated between the bearings will cause pounding in either bearing, once for each rotation. Even an unbalance situated close to one bearing will also create an alternating pressure upon the other bearing. This mutual influence can be compensated by means of an electrical network which adds to the signal from one bearing a small corrective signal derived by attenuation and phase shifting from the signal obtained at the other bearing, and vice versa. The required amount and phase of the corrective signals are fixed parameters for each balancing arrangement, and they can be determined—and pre-set—experimentally.

Prior proposals which recognized these possibilities to some degree, have been limited to use for single frequencies and thus they have either required readjustment for each change of frequency or limited the operator to a finite number of pre-determined speeds selected, for example, by switches or by push buttons similar to those of radio sets.

However, it has been found desirable to test the balance of a rotor at a variety of speeds, especially if the ultimate or normal speed in use is very high. Therefore, all part of the dynamic balancing equipment should be suitable for use at all possible speeds of rotation with a minimum of readjustments. This requirement also refers to the mutual apportioning network mentioned above. Although attenuation independent of frequency is easily obtained by means of resistive voltage dividers, there is no stationary device known which changes the phase of a signal by a constant angle regardless of frequency, nor one which maintains the relative phases of its harmonics.

As a solution of this problem, the present invention contemplates a provision of more than one pressure sensitive device at each bearing of a dynamic balancing machine. Preferably two pickup elements, such as piezo-electric crystals, displaced by an angle of 90°, such as shown in Figure 3 of the drawings are employed. In Figure 4 of the drawings there is shown diagrammatically an arrangement including a rigid support 100 having the notched end frames 20 similar to the bearing supports shown in Figure 3. The end frames serve to support the bearings 22 which enclose the shafts or trunnions 15 which may be parts of the rotatable body 25 to be tested for unbalance. The bearings and the supported body are shown in broken lines. The bearings supporting the left hand end of the body rest upon the piezo-electric crystal piles $Q_{LI}$ and $Q_{LII}$ while the right hand bearing rests upon the corresponding piles of crystals $Q_{RI}$ and $Q_{RII}$.

The test body 15, 25 may be rotated by means of a motor 102 through a flexible coupling indicated at 103. Each of the crystal piles, representing a source of weak voltage, may be connected to a preamplifier for better detection and transmission to the indicating devices. There will thus be available a total of four output voltages, a pair from the left hand bearing, which may be designated respectively $E_{LI}$ and $E_{LII}$, and a pair from the right hand bearing designated $E_{RI}$ and $E_{RII}$ each pair in general being identical in all respects except that the second signal of each pair is delayed with respect to the first by the time in which the rotor turns through an angle of 90°. Since the vector of unbalance has the same speed as the rotor, it follows that the basic frequency of the unbalance signals is also displaced by 90° in the pair of signals from the same bearing. As is well known, any fraction of a signal amplitude can be had with any desired phase by means of purely resistive voltage dividers from a pair of identical sources with a 90° phase displacement. A pair of balanced sources is preferred in order to avoid the use of phase reversing arrangements.

A variety of phased potentiometers may serve the purposes of this invention. One very simple and elementary device is shown in Figure 5 of the drawings. The area 30 represents a thin layer of conductive material, such as graphite coated upon a sheet of paper. Four terminals—A, B, C, and D—are established upon this surface each being disposed at the corner of a square. To each two opposite corners is fed the signal from one of the pair of balanced sources. As shown by broken lines in the diagram, the current between A and B due to the source $E_I$ will then produce a potential distribution indicated by the equipotential lines surrounding and separating the point A and B. The line of zero potential between A and B will pass through the terminals C and D and the center O. A similar arrangement of equipotential surrounds and separates the terminals C and D, the field being created by the current from the source $E_{II}$. With respect to the latter distribution of potential, the terminals A and B and the center O are at zero potential. Thus an electrode touching the point O is at zero potential with respect to both sources, and if it is moved along the line AB, it picks up only voltages due to the source $E_I$, and moving along the line CD it would pick up only those voltages due to $E_{II}$. All other points of the area will yield any desired combination of voltage corresponding to any desired fraction of the signal amplitude with any desired phase.

Other more conventional devices for adding voltage fractions are suggested in Figures 6 and 7 of the drawings. In Figure 6, the sources $E_I$ and $E_{II}$ are grounded and connected in the circuits with the voltage dividers $VD_I$ and $VD_{II}$. These voltages dividers are tapped at selected points and connected to the primary 32 of the transformer T, and the output taken from the secondary 33 of the transformer. Alternatively, the taps from the voltage dividers $VD_I$ and $VD_{II}$ are connected each to one of the grids of the amplifier tubes $V_I$ and $V_{II}$ having a common load resistance 34 as shown in Figure 7.

In Figure 8 of the drawings there is shown a diagram of a system providing an apportioning network fed from four balanced low impedance sources $E_{LI}$, $E_{LII}$, $E_{RI}$, and $E_{RII}$, obtained for example, from the crystal pickups $Q_{LI}$, $Q_{LII}$, $Q_{RI}$, and $Q_{RII}$ of the balancing machine shown in Figure 4 of the drawings. Four vacuum tubes $CF_{LI}$, $CF_{LII}$, $CF_{RI}$, and $CF_{RII}$ are employed as the balanced sources of low impedance, each being in a circuit derived from the well known cathode follower circuit. The grids of these tubes are fed from the pressure pickup through the preamplifiers $PA_{LI}$, etc. Two main amplifiers designated $A_L$ and $A_R$ are provided. The cathode load resistances $R_C$ of the tubes are all made about equal to the reciprocal of their mutual conductance $G_M$, thus yielding an output equal to one-half of their input voltages. Their anode load resistances $R_A$ are made equal to those of the cathode, yielding therefore—with the anode current equal to the cathode current—the same output but with opposite phase respective to ground. The sources of high tension are indicated at HT. These operate in the same manner as the source of current in any cathode follower circuit, supplying the current which is controlled by the vacuum tubes and varied by them to furnish the signals to the indicators.

The main signals for subsequent amplification and observation may be taken from the cathodes of the tubes $CF_{LI}$ and $CF_{RI}$. The corrective fractions $F_{LI}$, $F_{LII}$, $F_{RI}$, and $F_{RII}$, are each derived from high resistance voltage dividers 35, 36, 37, and 38 connected to the anode and cathode of each of the tubes CF. Coupling condensers, to insulate these potentiometers against direct current, may be dispensed with if the currents through the potentiometers are too small to upset the proper working conditions of the associated tubes. Three voltages are thus added at the input of each of the main amplifiers. The signal $E_{LI}$ and the corrective fractions $F_{RI}$ and $F_{RII}$ are compounded at the impact of the amplifier $A_L$, while the signal $E_{RI}$ and the corrective fraction of $F_{LI}$ and $F_{LII}$ are added at the input of the amplifier of $A_R$. Both of these amplifiers may incorporate signal attenuators, preferably near the input, affecting all voltages fed to them in equal proportion.

In effecting dynamic balancing the convenient assumption is made that there are only two masses of unbalance, located in transverse planes near the left and right bearings, but between these bearings. An unbalance in the plane near the left bearing thus creates a small signal in the right hand bearing and similarly an unbalance in the plane near the right hand bearing gives rise to a signal in the left hand bearing. These complicating signals are eliminated by a compensating signal electrically applied. One way to set up the arrangement for proper compensation is to add deliberately in the left hand plane of the rotor an additional very large unbalance mass and then adjust until it yields no signal on the output of the right hand pickup; then to repeat the same adjustment, with a weight in the right hand plane, with reference to the left hand pickup. The two corrective signals are thus so apportioned that they just compensate in amplitude and phase those transmitted by mechanical coupling along the rotor body.

The system outlined above lends itself to simultaneous observation of both bearings. However, it is also possible to use a single amplifier $A_0$ and a single indicating device as shown in the diagram of Figure 9. In this arrangement a three-pole, double-throw, change-over switch is used to connect alternately the one or the other groups of three voltages each to the input of the single amplifier. This switch is indicated at 40 in Figure 9 and the electrical connections are self-explanatory.

The amplifiers of Figs. 8, 9, 10 and 11 are grounded in the conventional manner. The output of the pre-amplifiers is split into equal and opposite signals in the cathode follower tubes, such as are shown in Figs. 8, 10 and 11, appearing at the anode and at the cathode respectively. These cathode follower tubes are thus the sources of signals balanced with respect to ground, and they are the sources indicated as $E_{II}$ in Figs. 5, 6 and 7 to which the various balanced voltage dividers are connected.

The amount and phase of the unbalance may be presented on the screen of a cathode ray tube, for example, in a pattern such as shown in Figure 12. A time-proportional voltage is applied to the horizontal deflection system of a frequency equal to that of the rotation of the rotor. The unbalance signal may cause vertical deflection. Then one way of referring the position of the rotor to the pattern on the screen, is to paint a spot on the rotor as an arbitrary reference mark, such as the mark M in Figure 14. A light source is indicated at N in the same figure, and a photoelectric cell U registers the intermittent passage of the mark M during successive rotations of the rotor. (This set-up may be used to start the scanning of the horizontal deflecting sawtooth voltage on the cathode ray tube.)

The zero (0°) mark on the trace in Figure 12 may mark the moment when the spot M passes the cell. After the rotor is stopped, it is brought into this position and the "heavy" point is then as many degrees retarded with reference to the pressure pickup point, as is the peak of the sine wave with reference to the start of the trace, namely 70° in the case of the pattern in Figure 12. That "heavy" point is the place where weight is to be removed, by an amount proportional to the amplitude of A of the sine curve in Figure 12. This curve is such as would be produced by the use of the network of Figures 8 and 9.

The introduction of a pair of pressure pickups in each bearing of a dynamic balancing machine, in addition to its use as already outlined in connection with the corrective apportioning net work may also be used in connection with a particularly simple indicating arrangement which forms one of the principal features of the present invention. For this arrangement, purely sinusoidal signals are assumed as should be expected from a round and rigid spindle or shaft and a pickup device which is substantially free from non-linear distortion and resonances.

In this case, it is proposed to feed the signals from both pick-ups in each bearing—each one corrected by adding fractions of the two signals from the other bearing—simultaneously by way of separate amplifiers each to a pair of deflecting plates of a cathode ray tube. If the two pairs of deflecting plates are displaced with respect to each other by the same angle as the pressure pick-ups connected to them, e. g. 90°, then the spot on the screen will describe a circle representing the locus of the tip of the unbalance vector in that bearing. Such an arrangement is shown in Figure 10 of the drawings, the diagram beginning with the tubes CF to which the preamplified signals are fed. Two voltage dividers are provided in parallel between the anode and cathode of each of the tubes and various fractions to be added to the primary signals from the several pickups are tapped off of these voltage dividers and suitably connected to be combined and applied to the main amplifiers $A_{LI}$, $A_{LII}$, $A_{RI}$, $A_{RII}$. In order to distinguish the two fractions taken off of each of the tubes, they will be modified by the subscripts $a$ and $b$. Thus the fraction $F_{LIa}$ and $F_{LIb}$ are taken off the respective voltage dividers or potentiometers of the first tube and led respectively to the amplifiers $A_{RI}$ and $A_{RII}$ after being combined with the main signals and other fractions to which it is allocated.

The following table represents the addition of the various main signals and fractions which are applied to the respective amplifiers:

| Amplifier: | Voltage combinations | | |
|---|---|---|---|
| $A_{LI}$ ⟶ | $E_{LI}$ | $F_{RIa}$ | $F_{RIIa}$ |
| $A_{LII}$ ⟶ | $E_{LII}$ | $F_{RIb}$ | $F_{RIIb}$ |
| $A_{RI}$ ⟶ | $E_{RI}$ | $F_{LIa}$ | $F_{LIIa}$ |
| $A_{RII}$ ⟶ | $E_{RII}$ | $F_{LIb}$ | $F_{LIIb}$ |

The left hand bearing amplifiers are connected to a cathode ray tube $CT_L$ and the right hand bearing amplifiers are similarly connected to the cathode ray tube $CT_R$, on which the circular patterns representing the loci of the unbalance vectors may be observed.

The radius of the circular pattern observed on the screen will be proportional to the amount of unbalance and the spot will be opposite a plate of the tube at the moment the unbalance vector points toward the pickup corresponding thereto. A timing mark in the trace—for example, by radial deflection or brightness control—may be provided by a separate timing device. This will indicate the angle between the unbalance vector and the timing mark on the rotor. The angle may either be read on a circular scale on the cathode ray tube screen or the timing device may be shifted around the rotor by a measured angle until the timing mark is in a prescribed position, such as on the top of the circle.

The system as thus outlined requires no separate time-proportional scanning deflection for the cathode ray tube. Instead, there are twice as many main signal amplifiers used; four amplifiers being provided, each preferably ending in a push-pull stage, when both bearings are to be observed simultaneously.

However, one indicating screen may be employed for alternately observing the amount and angle of unbalance at the right and left hand bearings by means of the arrangement indicated in Figure 11 of the bearings. In this arrangement the cathode ray tube $CT_0$ is connected with the two amplifiers $A_R$ and $A_L$ in the same manner as the tubes $CT_R$ and $CT_L$ in Figure 10 to their respective pairs of amplifiers, and switch-over arrangments are provided for connecting the amplifiers with one or the other proper combination of main signals and corrective fractions from the bearings. The wiring diagram in Figure 11 shows that the multiple gang double-throw switch 50 will connect the voltage sources with the amplifiers according to the following schedule:

*Switch left*

$A_L \longrightarrow E_{LI} + F_{RIa} + F_{RIIa}$
$A_R \longrightarrow E_{LII} + F_{RIb} + F_{RIIb}$

*Switch right*

$A_L \longrightarrow E_{RI} + F_{LIa} + F_{LIIa}$
$A_R \longrightarrow E_{RII} + F_{LIb} + F_{LIIb}$ Any other convenient switching arrangement involving the use of one or more than one switch may be used.

Figure 13:
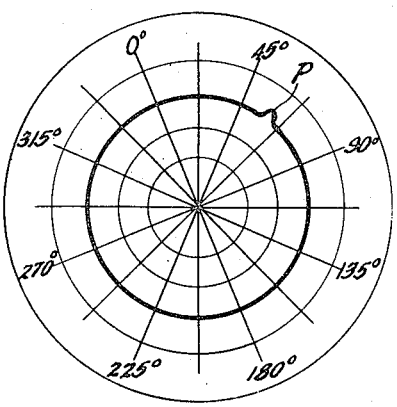
Figure 13 is a similar view showing a screen and light pattern utilized in connection with the arrangement shown in Figures 10 and 11.
Figure 14:
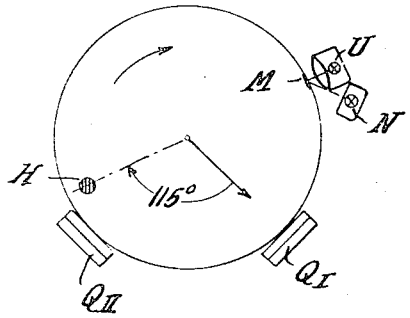
Figure 14 is a diagrammatic view in end elevation of a test piece and means for correlating the positions of the pattern and the test piece.

Figure 13 of the drawings shows a circular trace or pattern such as is produced by the scheme illustrated in Figures 10 and 11 of the drawings. Its meaning will be understood by correlating Figures 14 and 15. The circular path of the pressure vector due to the mass H in Figure 14 is decomposed into two sine waves by the two pickups $Q_I$, $Q_{II}$. These are amplified and fed to the pairs of deflecting plates $P_1$, $P_2$ and $P_3$, $P_4$ in the cathode ray tube shown in Figure 15, where the original circle is thus reconstituted, its radius being proportional to the mass of H and easily read by means of the concentric circular scale (Figure 13).

Figure 15:
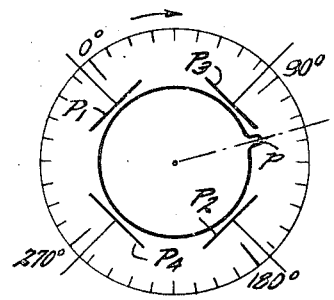
Figure 15 is a view similar to Figure 13 but showing a slightly different scale for the screen, and also indicating the plates of the cathode ray tubes.

In order to locate the angular position of H on the rotor the spot M is used, the passage of the spot past the photocell U creating a notch or protuberance $p$ in the trace, by known electrical connections. If it is assumed that the beam of the cathode ray tube is just opposite the plate $P_2$, whenever the mass H is opposite the pickup $Q_I$, then it will be as many degrees past that point at the time the spot M faces the photocell, as the notch in the trace is retarded from plate $P_2$. In the case of Figures 14 and 15 the displacement is 115°, as clearly indicated in both figures.

Among the numerous advantages of these schemes, several of the more important may be mentioned. Due to the absence of time proportional deflecting devices, the arrangements are suitable for any speed of rotation without any change of parameter or other adjustments. The circular scanning makes the best use of the area of the cathode ray screen. It also permits visual distinctions between the signal itself, represented by a circular pattern; random noises, represented by the thickening of the signal pattern; and ground vibrations, indicated by vertical bobbing of the circular trace.

It is understood that various changes and modifications may be made in the embodiments illustrated and described herein without departing from the scope of the invention as defined in the following claims.

Having thus described the invention, what is claimed as new and desired to be secured by Letters Patent is:

1. In a balancing machine for a rotary member, axially spaced bearings for said member, means for rotating said member in said bearings, a plurality of pressure sensitive elements disposed at each bearing and angularly displaced with respect to each other around the axis of rotation of said member, said pressure sensitive elements being so constructed and arranged as to sustain substantially the entire weight of said member and be subjected to substantially the total alternating pressure effects of any forces due to unbalance of the member, means for detecting the pressure impulses sustained by the respective elements at one bearing point and for producing signals corresponding to said impulses, means to modify individually the phase and amplitude of such signals, means for applying a correction to each of said signals proportional to the pressure impulses sustained by one of the pressure sensitive elements at the other bearing point, and means for combining the signals and rendering an indication of the amplitude and phase of the unbalance forces which they represent.

2. In a balancing machine for a rotary member, axially spaced bearings for said member, means for rotating said member in said bearings, two pressure sensitive elements disposed at each bearing and displaced with respect to each other around the axis of rotation of said member through an angle of 90°, and means for detecting the pressure impulses sustained by the respective elements at each bearing point and for producing a signal corresponding to said impulses, means for applying a correction to each of said signals proportional to the pressure impulses sustained by the two elements at the other bearing point, and means for combining the signals and rendering an indication of the amplitude and phase of the unbalance forces which they represent.

3. In a balancing machine for a rotary member, a rigid support, axially spaced bearings for said member, means for rotating said member in said bearings, a pair of piezo-electric crystal units disposed between said support and each of said bearings and in supporting relationship to the latter, the units of each pair being displaced with respect to each other around the axis of rotation of the member through an angle of 90°, the units being symmetrical about a vertical plane through said axis, and electric means for detecting the pressure impulses sustained by the respective units at each bearing point and for producing a signal corresponding to said impulses, electric means for applying a correction to each of said signals proportional to the pressure impulses sustained by the two units at the other bearing point, and electronic means for combining the signals and rendering a visual indication of the amplitude and phase of the unbalance forces.

4. In a balancing machine for a rotary member, axially spaced bearings for said member, means for rotating said member in said bearings, two pressure sensitive voltage generating elements disposed at each bearing and displaced with respect to each other around the axis of rotation of said member through an angle of 90°, electric means for transmitting a main signal from each of said elements proportional to the total pressure effect at said element, electric means for transmitting a signal proportional to a fraction of the voltage generated at each of said elements, electric means for combining certain of said main signals with fractional signals from the two elements at the bearing opposite to the one at which the element yielding said main signal is located, and electric means for indicating the combined effects of said corrected main signals to show the amplitude and phase of the unbalance force of said member.

5. In a balancing machine for a rotary member, axially spaced bearings for said member, means for rotating said member in said bearings, two pressure sensitive voltage generating elements disposed at each bearing and angularly displaced with respect to each other around the axis of rotation of said member, electric means for transmitting a main signal from each of said elements proportional to the total pressure effect at said element, electric means for transmitting a plurality of signals each proportional to selected fractions of the voltage generated at each of said elements, electric means for combining each main signal with fractional signals from the two elements at the bearing opposite to the one at which the element yielding said main signal is located, and electric means for indicating the combined effects of said corrected main signals to show the amplitude and phase of the unbalance force of said member.

6. In a balancing machine for a rotary member, axially spaced bearings for said member, means for rotating said member in said bearings, two pressure sensitive elements disposed at each bearing and displaced with respect to each other around the axis of rotation of said member, and means for detecting the pressure impulses sustained by the respective elements at each bearing point and for producing a signal corresponding to said impulses, means for applying a correction to each of said signals proportional to the pressure impulses sustained by the two elements at the other bearing point, and means for combining the signals and rendering an indication of the amplitude and phase of the unbalance forces which they represent.

HEINZ E. KALLMANN.

REFERENCES CITED

The following references are of record in the file of this patent:

UNITED STATES PATENTS

| Number | Name | Date |
| --- | --- | --- |
| 1,486,115 | Allen | Mar. 11, 1924 |
| 1,599,922 | Rathbone | Sept. 14, 1926 |
| 2,315,578 | Baker | Apr. 6, 1943 |
| 2,322,561 | Bevins et. al. | June 22, 1943 |
| 2,329,654 | Rouy | Sept. 14, 1943 |
| 2,344,753 | Van Degrift | Mar. 21, 1944 |

FOREIGN PATENTS

| Number | Country | Date |
| --- | --- | --- |
| 549,548 | Great Britain | Nov. 26, 1942 |
| 565,286 | France | Nov. 6, 1923 |
| 585,907 | Germany | Oct. 12, 1933 |
| 659,871 | France | Feb. 11, 1929 |